Feb. 3, 1942.  R. S. BABCOCK ET AL  2,271,613
PLATE-RIDING ATTACHMENT
Filed July 9, 1940  2 Sheets-Sheet 1

INVENTORS
ROGER S. BABCOCK
LLOYD W. YOUNG
BY
ATTORNEY

Feb. 3, 1942.  R. S. BABCOCK ET AL  2,271,613
PLATE-RIDING ATTACHMENT
Filed July 9, 1940  2 Sheets-Sheet 2
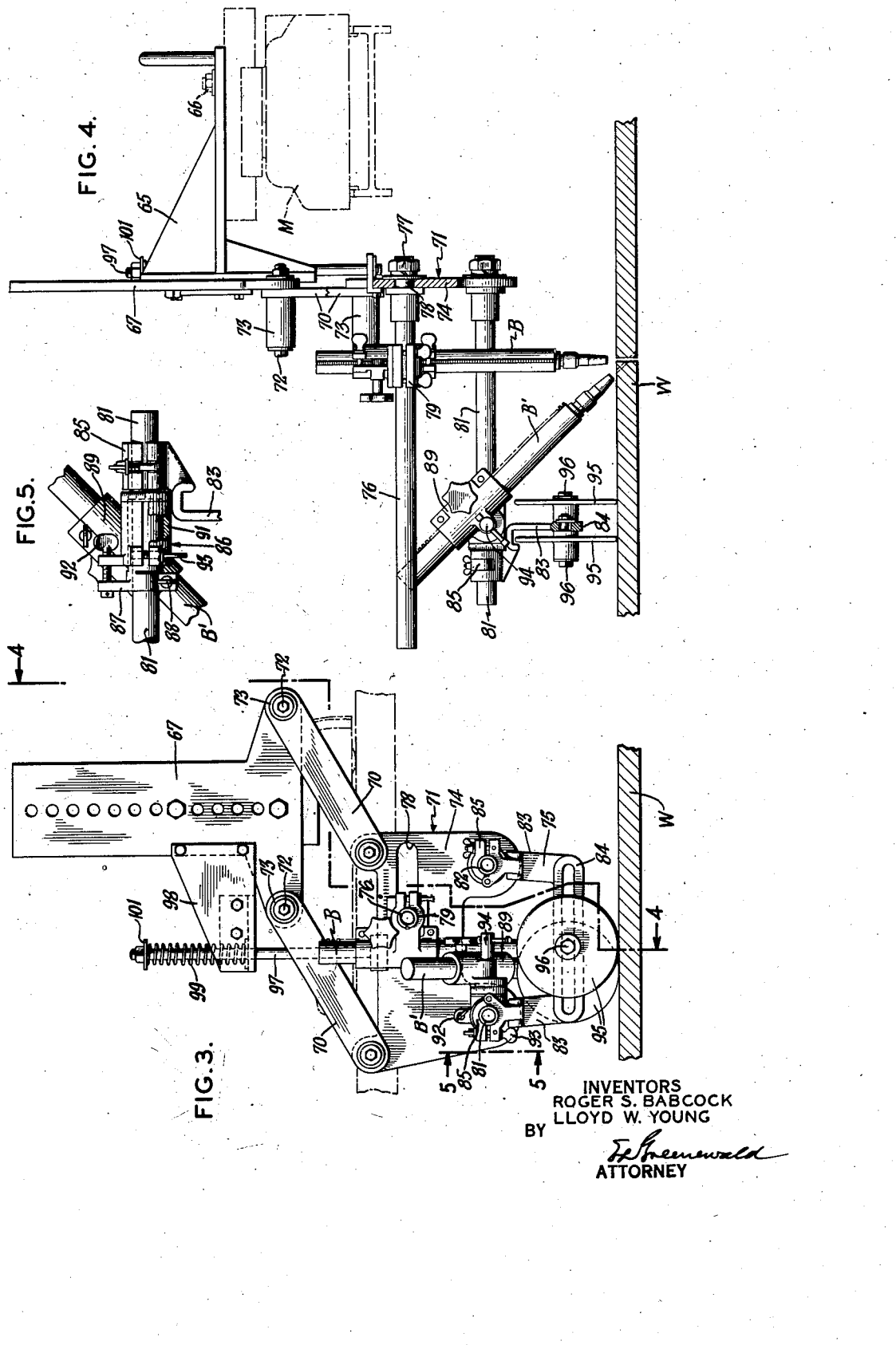
INVENTORS
ROGER S. BABCOCK
LLOYD W. YOUNG
BY
ATTORNEY Patented Feb. 3, 1942

2,271,613

UNITED STATES PATENT OFFICE 2,271,613

PLATE-RIDING ATTACHMENT

Roger S. Babcock, Plainfield, and Lloyd W. Young, Scotch Plains, N. J., assignors to Oxweld Acetylene Company, a corporation of West Virginia Application July 9, 1940, Serial No. 344,486

14 Claims. (Cl. 266—23)

This invention relates to tool supporting and guiding apparatus and more particularly to plate-riding devices adapted to propel a plurality of blowpipes along and in uniform spaced relation to a work surface.

Steel plates and other structural members ordinarily are not absolutely flat, but have undulations and other irregularities in the surface of the metal caused by warpage, and the like, which remain, even when the metal is laid upon a flat support. It is often desirable to propel blowpipes or other tools along such an irregular metal body while maintaining such blowpipes at a constant distance from the surface. The present invention is specifically directed to means for applying one or more flame-cutting jets, as for example, flame-severing or flame-beveling jets, along a predetermined path with respect to a relatively large steel plate or similar work surface, while maintaining a uniform relation between the parts.

Large steel plates, of the character mentioned, may have a deviation from flatness of as much as substantially two inches without departing from standard specifications, which deviation may be increased considerably during a flame-cutting or similar process as a result of further distortion produced by stresses during heating. Ordinarily, when cutting large plates, use is made of a carriage which is supported and propelled along a level track or templet adjacent to the path to be followed by the blowpipe. An arm or other supporting means secured to the carriage maintains the blowpipe or other tool in operative relation to the metal plate or other work surface and imparts the longitudinal motion of the carriage along its track to the blowpipe means or other tool. It is apparent that if a blowpipe or other tool were to be passed over the surface of an irregular plate while being rigidly secured to a carriage moving on a level track, the vertical spacing between the metal plate and the tool would vary in accord with the irregularities in the work surface.

With ordinary vertical flame-cutting, a certain moderate amount of relative vertical motion between the discharge end of the blowpipe and the metal plate may be tolerated, as when the rise and fall is a fraction of an inch. With other operations, as when projecting a flame-cutting jet diagonally against the work surface, so as to form a beveled or scarfed edge, both the vertical spacing between the nozzle and the work, and the extraneous lateral displacement of the jet must be maintained within relatively small tolerances, for example, tolerances within 0.030". The requirements are especially exacting when relatively long plates are flame severed and then trimmed and/or beveled to form a straight scarfed edge adapted to be disposed in adjoining relation to a similarly prepared edge for the deposit of weld metal. A process for performing such successive cutting operations, for example flame severing, trimming, and beveling, is disclosed in United States Patent No. 2,184,562 which was issued on December 26, 1939, to H. E. Rockefeller, and J. H. Rountree. When performing these operations, the slightest variation of the blowpipe holder transversely of the path in either a vertical or sidewise direction, produces a corresponding change in the shape of the edge being formed. If such changes exceed narrow limits, the formed edges no longer abut properly for an ensuing welding operation.

Accordingly, the principal objects of the present invention are to provide tool-supporting and guiding apparatus overcoming the defects previously enumerated; to provide a novel blowpipe carrier with improved means for securing the carrier to a propelling carriage so that the carrier may ride or float at a constant distance above the work surface; to provide means for maintaining a blowpipe carrier at a uniform distance above and substantially parallel to the work surface; and to provide floating attachments for cutting machines which maintain a predetermined normal relation of angle and spacing of each cutting blowpipe with respect to a work surface, irrespective of undulations in the surface contour of the steel being cut. These and other objects of the present invention will become more readily apparent from the following description and from the accompanying drawings disclosing different forms of apparatus embodying principles of the invention. In the drawings:

Fig. 3 is a side elevational view of another form of plate-riding device adapted for supporting a cutting and a beveling blowpipe;

Fig. 4 is a sectional view taken on the line 4—4 of Fig. 3; and

Fig. 5 is an end elevational view of the adjustable mounting means for the beveling blowpipe.

Generally speaking, the invention comprises a bracket or frame adapted to be detachably mounted on a portable self-propelled machine.

A parallelogram linkage depends from the frame and supports the blowpipes in operating relation to one another and to the work surface. The blowpipes are sustained at a fixed height above the work surface by means of a shoe or wheel in engagement with the work surface.

Figure 2:
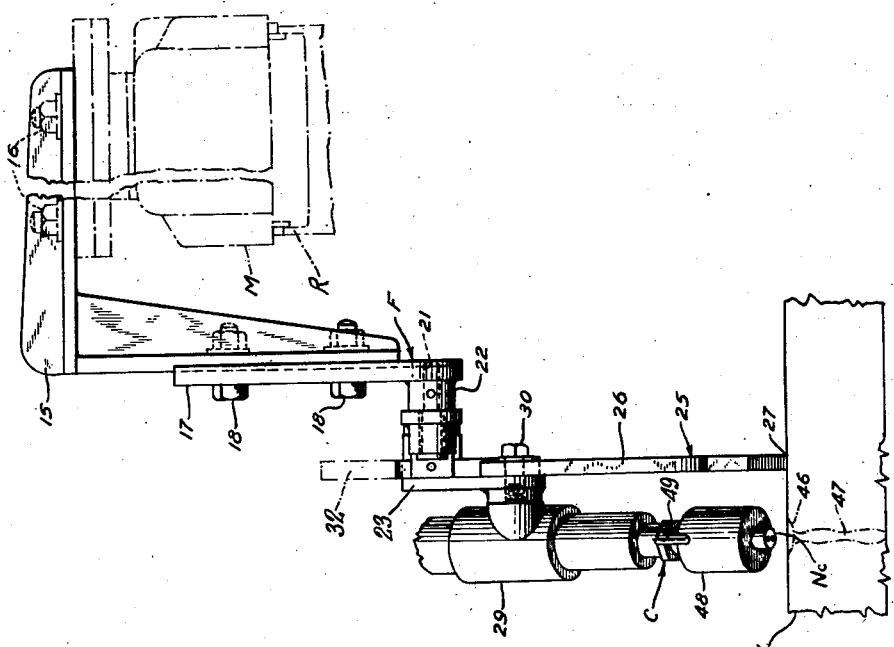
Figs. 1 and 2 are side elevational and end elevational views respectively of one form of plate-riding device mounted on a portable self-propelled carriage, for supporting cutting and trimming blowpipes spaced along the path of travel.
Figure 1:
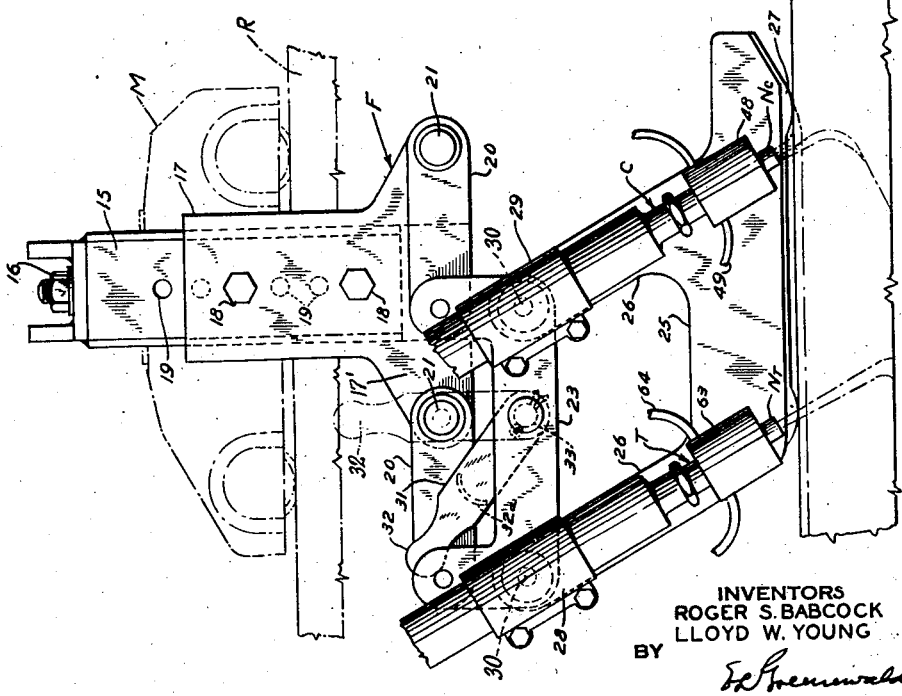

Referring to the drawings, and particularly to Figs. 1 and 2, one form of apparatus for producing a smooth cut in a metallic body or workpiece W, may comprise a cutting torch or blowpipe C provided with a cutting nozzle Nc, and a trimming torch or blowpipe T having a special trimming nozzle Nt, which nozzles operate as disclosed in Patent No. 2,184,561 dated December 26, 1939. Both blowpipes are carried by a suitable supporting frame F, which may be moved relatively to the work by a propelling machine M.

The machine M may be of any suitable construction by means of which the speed of the cutting and trimming blowpipes may be properly adjusted. That shown in dot and dash lines in the drawings is of the type disclosed in United States Patent 2,183,605 dated December 19, 1939, and is adapted to be propelled along a rail or track R placed in any convenient position adjacent to the work. It will be observed that the track shown in Figs. 1 and 2 is positioned above the level of the work, and the frame F is supported by an angular supporting member or bracket 15 consisting of a horizontal arm removably secured at one end to the machine M by bolts 16, and a vertical portion depending from the free end of the arm at a point spaced transversely from the machine or carriage M.

As shown, the frame F comprises a main supporting plate or member 17, of inverted T shape which is removably and adjustably attached to the bracket 15 by means of bolts 18 which are received in openings 19 provided in the bracket 15. The plate 17 terminates at its lower end in a horizontal cross plate 17' extending generally along or parallel to the path of travel. Coplanar links 20 are pivotally mounted on the extremities of the cross plate 17' by means of pivot pins 21, and are maintained spaced therefrom by spacing sleeves 22 encircling the pivot pins. As shown in Fig. 1, the blowpipe carrier, which sustains the blowpipes, comprises a vertically movable underframe having a generally horizontally located U-shaped member 23, the upwardly extending extremities of which are pivotally connected in any suitable manner to the left end of the respective links 20. The member 23 forms a support for a guiding plate or floating skid 25 which has upwardly extending arms 26 by means of which the plate 25 is secured to the member 23. The two links 20, the member 23, and the lower portion of the plate 17, comprise a parallelogram linkage which maintains the lower portion of the member 23 constantly in a horizontal position. On the lower edge of the guiding plate, spaced surface-engaging members such as curved sliding portions or shoes 27 are provided, which portions may be either formed of or coated with a suitable heat resisting alloy, and which are adapted to bear against and slide over the upper surface of the work at points adjacent to the respective blowpipes, with the plate extending substantially parallel to the line of operation. Leading and trailing blowpipe-carrying sleeves 29 and 28, respectively, are also mounted on the lower extremities of the U-shaped member 23 by means of bolts 30. As shown in Fig. 1, the cutting blowpipe C is removably and adjustably mounted in the leading sleeve 29 while the trimming blowpipe T is movably and adjustably mounted in the trailing sleeve 28, and both of the blowpipes are maintained at a suitable distance from the surface of the work by the guiding plate 25.

It will be apparent that with the link construction of the supporting frame F, the torch assembly and guide plate are pivotally supported and are adapted to slide over the surface of the work; such a construction will allow the torch assembly to move up or down over any irregularities that may be encountered along the line of the cut. Manually operable means may also be provided for raising and holding the torch assembly away from the surface of the work when not in use. Such means may comprise a handle 32 formed on a lever or member 31 pivoted at its lower extremity to the central portion of the U-shaped supporting member 23 by means of a pin 33. Adjacent to the handle 32, the lever 31 is provided with an arc-shaped latch 32a which is adapted to engage the circular head of the pivot pin 21, when the lever is located as indicated in dot and dash lines in Fig. 1, to thereby hold the torch assembly away from the surface of the work. The assembly is rendered operative by disengaging the latch 32a from the pin 21 and allowing the handle to swing away from said pin.

The modified plate-riding device disclosed in Figs. 3, 4, and 5, is similar to the form already described. A supporting member or bracket 65 comprises a horizontal portion secured to the transverse slide of a self-propelled machine M by bolts 66. The bracket 65 extends in a transverse direction away from the machine and terminates in a depending vertical portion to which is adjustably attached a main supporting plate 67 preferably of inverted T-shape of the type previously described. Parallel coplanar links 70 are pivotally attached at one end to the lower extremities of the supporting plate 67. The links 70 make pivotal connection at their lower extremities with a blowpipe carrier 71 which is adapted to support one or more blowpipes in operative relation to a workplate W. The pivotal connections at the ends of each link 70 are formed by upper and lower bolts 72 extending through collars 73, and located in normally upper and lower horizontal planes. The parallel links 70 and the members which they connect form a parallelogram linkage so that as the blowpipe carrier 71 rises and falls in its movement over the workplate the angular position of the blowpipes is maintained constant.

The blowpipe carrier 71 comprises an underframe or vertical plate 74 supported by the links 70, and a wheel-supporting member 75 adjustably connected to the plate. A generally horizontal upper mounting rod 76 preferably comprises a transversely extending tube secured at its flanged inner end to the underframe 74 as by means of a nut 77, which nut clamps the flanged end of the rod adjustably within a slot 78 formed in the underframe 74. A vertical blowpipe B is supported on the rod 76 by means of a clamp 79, which clamp is keyed to and slidable along the rod 76 to position the blowpipe B transversely with respect to the desired path of travel. Accordingly, the blowpipe B is maintained in a vertical position and adapted to form a squaring off cut in the workplate W. The blowpipe B is adjustable relatively to the path of travel by loosening nut 77 and sliding the rod 76 within the slot 78 as desired.

One or more lower mounting rods 81 and 82 comprise tubes extending in a horizontal plane transversely from the underframe 74. Wheel-supporting member 75 preferably comprises a yoke-shaped bracket, the arms 83 of which extend upwardly from the ends of a slotted bar 84 for connection with the rods 81 and 82, respectively. Hinged clamps 85 connect the arms 83 with the rods 81 and 82 and allow the wheel-supporting member 75 to be adjustably positioned along the rods. A blowpipe B', herein disclosed in position to perform a beveling operation, is slidably attached to the rod 81 by means of a clamp 86, the construction of which is best understood from Fig. 5. The clamp 86 comprises an inner tubular member 87 which is pivotal about and slidable along the rod 81. The member 87 may be clamped in predetermined position by means of a thumb screw 88 to thereby hold the blowpipe B' in predetermined angular position about rod 81 as an axis, and in proper transverse relation to the path of travel. The blowpipe B' is held within a blowpipe clamp 89 which in turn is pivotally secured to a sleeve 91 slidably mounted on the tubular member 87. The sleeve 91 may be shifted along the member 87 toward the machine M by turning thumb screw 92 to thereby provide accurate transverse positioning of the blowpipe B'. A thumb screw 93 may be employed to lock the parts in adjusted position. The angle of bevel formed with the blowpipe B' may be adjusted by swivelling the clamp 89 about the axis of locking screw 94 as shown in Fig. 4.

One or more wheels 95 may be rotatably supported on the member 75 by mounting the wheels upon shouldered bolts 96 extending through the slotted bar 84. After both blowpipes have been positioned the wheels may be correspondingly adjusted by sliding them to predetermined positions along the bar 84.

Resilient supporting means preferably are provided to retard the sudden downward movement of the parts when the wheels roll over the end of the workpiece W. As shown in Fig. 3 a rod 97 extends upwardly from the underframe 74 and passes through an apertured bracket 98 secured to the plate 67. A compression spring 99 is clamped between the bracket 98 and a washer 101 at the upper end of the rod 97, to thereby resist downward motion of the underframe 74.

The wheel-supporting member 75 may be quickly detached from the rods 81 and 82 by swinging the clamps 85 into open position, allowing the wheel-supporting member 75 to be completely separated from the mounting rods 81 and 82. Since the rods 81 and 82 are parallel the member 75 may be positioned at any point along their length, and if desired, may be connected to the rods at a point adjacent to the underframe 74, to the right of the blowpipes, when looking at Fig. 4.

The invention herein disclosed may be modified widely as will be apparent to anyone skilled in the art, without departing from the scope of the invention or sacrificing its advantages.

We claim:

1. In a blowpipe carrying and guiding attachment for self-propelled cutting, welding, and similar machines, the combination of an arm having one end thereof constructed and arranged to be rigidly secured in a horizontal position to a self-propelled carriage in such manner that the other end of said arm is spaced from one side of said carriage; a movable blowpipe carrier; a blowpipe secured to and movable with said carrier along a predetermined path; vertically swingable link means pivotally supporting said carrier from said arm adjacent said other end thereof, said link means supporting said carrier and said blowpipe at a distance away from said side of said carriage and in such manner that both said carrier and said blowpipe are freely swingable in a vertical plane in unison relatively to said arm and relatively to the work to be cut or welded with said blowpipe; and a work-engaging member secured to said carrier and constructed to move the latter vertically responsively to irregularities on the surface of the work and thereby maintain the nozzle of said blowpipe at a substantially uniform distance from said surface throughout a cutting or welding operation.

2. A blowpipe carrying and guiding attachment as claimed in claim 1, in which said link means comprises at least a pair of parallel links, the pivotal connections of said links to said carrier being located at points spaced along said path and in one plane, and the pivotal connections of said links to said arm normally being in another plane.

3. Flame-cutting apparatus comprising a carriage adapted to be propelled along a predetermined path on the surface of a metal body; an arm projecting from the side of said carriage; an underframe; a plurality of blowpipe means secured to said underframe spaced along the path of travel; means for mounting said underframe to said arm so that it may move up and down relatively thereto; and a device secured to said underframe and adapted to engage said surface at points adjacent to said respective blowpipe means, to raise and lower said underframe in accordance with irregularities of said surface and thereby keep each of said blowpipe means at a uniform distance from said surface.

4. Apparatus as claimed in claim 3 including resilient means extending between said arm and said underframe adapted to oppose the downward motion of said underframe.

5. Plate riding device for blowpipe means comprising a carriage; a bracket adapted to be detachably connected to said carriage; said bracket comprising a vertical portion having a member extending generally along the desired path of travel, and a horizontal portion attached to said carriage and adapted to support said vertical portion spaced from said carriage at a point above the surface of a workplate; a blowpipe carrier; link means pivoted to said carrier and to said member about parallel horizontal axes spaced on said member and on said carrier along said path of travel; and means for engaging said surface to maintain said member at a uniform distance from said surface.

6. Plate-riding device for a self-propelled blowpipe machine having a carriage adapted to move along a predetermined path, and having at least one blowpipe propelled by said carriage along the desired line of operation over the surface of a workplate said device comprising a supporting member spaced from said carriage; parallel links pivotally suspended from said member at points above and spaced along the line of operation; a blowpipe carrier extending above and generally parallel with the line of operation pivotally attached to said parallel links; and a skid comprising an elongated member slidably engaging said workplate and extending generally parallel with the line of operation, said skid being adapted to maintain said blowpipe carrier at a predetermined distance above the surface of said workplate.

7. Plate-riding device as claimed in claim 6 wherein said skid is provided with downwardly projecting surface-engaging shoes.

8. Plate-riding device for a blowpipe adapted to be propelled by a carriage along the desired line of travel on the surface of a workplate, said device comprising a supporting member secured to and extending from said carriage; and a blowpipe carrier connected to said member and adapted to ride on said workplate and to move up and down relative to said member in accordance with irregularities in the surface of said workpiece, said carrier comprising an underframe movably mounted on said member, at least one mounting rod means extending horizontally from said underframe transversely of the line of travel, a blowpipe clamp slidable on said rod means and adapted to support a blowpipe, and means slidable on said rod means for engaging and riding on the surface of said workplate.

9. Plate-riding device for a blowpipe adapted to be propelled by a carriage along the desired line of travel on the surface of a workplate, said device comprising a supporting member secured to and extending transversely from said carriage; and a blowpipe carrier connected to said member and adapted to ride on said workplate and to move up and down relative to said member in accordance with irregularities in the surface of said workplate, said carrier comprising an underframe movably mounted on said member, a plurality of mounting rods extending in the same plane horizontally from said underframe transversely of the line of travel, a wheel support slidably mounted on at least one of said rods, a wheel rotatably mounted on said support for rolling engagement with said surface, and a blowpipe holder slidable on one of said rods adjacent to said wheel support for positioning a blowpipe in operative relation to said workplate.

10. Plate-riding device for blowpipes adapted to be propelled by a carriage along the desired line of travel on the surface of a workplate, said device comprising a supporting member secured to and extending from said carriage; and a blowpipe carrier connected to said member and adapted to ride on said workplate and to move up and down relative to said member in accordance with irregularities in the surface of said workplate, said carrier comprising an underframe movably mounted on said member, upper and lower mounting rods extending substantially horizontally from said underframe transversely of the line of travel, blowpipe holders slidably mounted on said rods for supporting a plurality of blowpipes in operative relation to the line of travel, and wheel-supporting means mounted on at least one of said rods and having a wheel adapted to engage the surface of said workplate.

11. Plate-riding device as claimed in claim 10 including means for adjustably positioning at least one of said mounting rods on said underframe.

12. Plate-riding device for blowpipes adapted to be propelled by a carriage along the desired line of travel on the surface of a workplate, said device comprising an arm adapted to connect with and extend outwardly from the side of said carriage; a blowpipe carrier; and links swingable in a vertical plane, said links extending between said carrier and said arm and being adapted to permit said carrier to move upward and downward relative to said arm; said carrier comprising an underframe, mounting rods spaced along the line of travel and extending from said underframe transversely of the line of travel, a blowpipe holder slidable along and pivotal about at least one of said rods for adjustably securing at least one blowpipe in operative relation to said workplate, and wheeled-supporting means adjustably mounted on said rods and adapted to ride on said surface and to maintain said blowpipe carrier at a uniform distance above said surface.

13. Apparatus for guiding a blowpipe along a path of travel on a workplate comprising a horizontal supporting member extending generally along said path of travel; means for propelling said member over a generally horizontal work surface; a blowpipe carrier; parallel coplanar links pivotally extending from points on said member spaced along said path of travel, and pivotally connecting with correspondingly spaced points on said carrier; and a plate-riding member adapted to support said carrier at a predetermined constant distance above said workplate.

14. Blowpipe guiding apparatus comprising a carriage adapted to move along a predetermined path spaced from a work surface; a supporting member attached to said carriage and projecting laterally therefrom; a generally horizontal blowpipe carrier beneath said member; links pivotally connected at opposite ends to said member and to said carrier about axes spaced on said member and said carrier along said path in upper and lower horizontal planes, said links being adapted to maintain said carrier in substantially horizontal position while allowing said carrier to rise and fall; and means adapted to engage said work surface to support said carrier at a uniform distance above said work surface.

ROGER S. BABCOCK.
LLOYD W. YOUNG.